(12) United States Patent
Lambert et al.

(10) Patent No.: US 10,464,041 B2
(45) Date of Patent: Nov. 5, 2019

(54) STRUCTURED PACKING ELEMENT HAVING A SPIRAL HELIX SHAPE

(71) Applicant: AXENS, Rueil Malmaison (FR)

(72) Inventors: Marie-Amelie Lambert, Chatou (FR); Driss Ait-Mhand, Bondy (FR); Florence Bernard, Clichy (FR); Jean-Philippe Toupance, Paris (FR)

(73) Assignee: AXENS, Rueil Malmaison (FR)

( * ) Notice: Subject to any disclaimer, the term of this patent is extended or adjusted under 35 U.S.C. 154(b) by 0 days.

(21) Appl. No.: 16/127,388

(22) Filed: Sep. 11, 2018

(65) Prior Publication Data

US 2019/0076815 A1    Mar. 14, 2019

(30) Foreign Application Priority Data

Sep. 12, 2017 (FR) .................................... 17 58444

(51) Int. Cl.
*B01J 19/32* (2006.01)
*B01J 8/34* (2006.01)
*C10G 11/18* (2006.01)

(52) U.S. Cl.
CPC .................. *B01J 19/32* (2013.01); *B01J 8/34* (2013.01); *C10G 11/182* (2013.01); *B01J 2219/30265* (2013.01); *B01J 2219/30475* (2013.01); *B01J 2219/315* (2013.01); *B01J 2219/3282* (2013.01); *B01J 2219/32203* (2013.01); *B01J 2219/32213* (2013.01); *B01J 2219/32258* (2013.01); *B01J 2219/32268* (2013.01); *B01J 2219/32408* (2013.01); *B01J 2219/3306* (2013.01)

(58) Field of Classification Search
CPC .................. B01J 19/32; B01J 2219/322; B01J 2219/32286; B01J 2219/32293; B01J 2219/32282; B01J 2219/32206; B01J 2219/32275; B01J 2219/315; B01J 2219/30265; B01J 2219/3306
See application file for complete search history.

(56) References Cited

U.S. PATENT DOCUMENTS

| | | | | |
|---|---|---|---|---|
| 4,224,257 A | * | 9/1980 | Robinson | F28F 25/08 261/111 |
| 4,411,942 A | * | 10/1983 | Nickel | B01J 19/32 261/94 |
| 5,716,585 A | * | 2/1998 | Senegas | B01J 8/34 422/144 |

* cited by examiner

*Primary Examiner* — Lessanework Seifu
(74) *Attorney, Agent, or Firm* — Millen, White, Zelano and Branigan, P.C.

(57) ABSTRACT

A packing structure obtained by assembling packing elements having a spiral helix shape, and the use of a structured packing composed of packing structure for an operation for bringing a gas into contact with a catalyst, and a process for manufacturing such a structured packing.

9 Claims, 5 Drawing Sheets

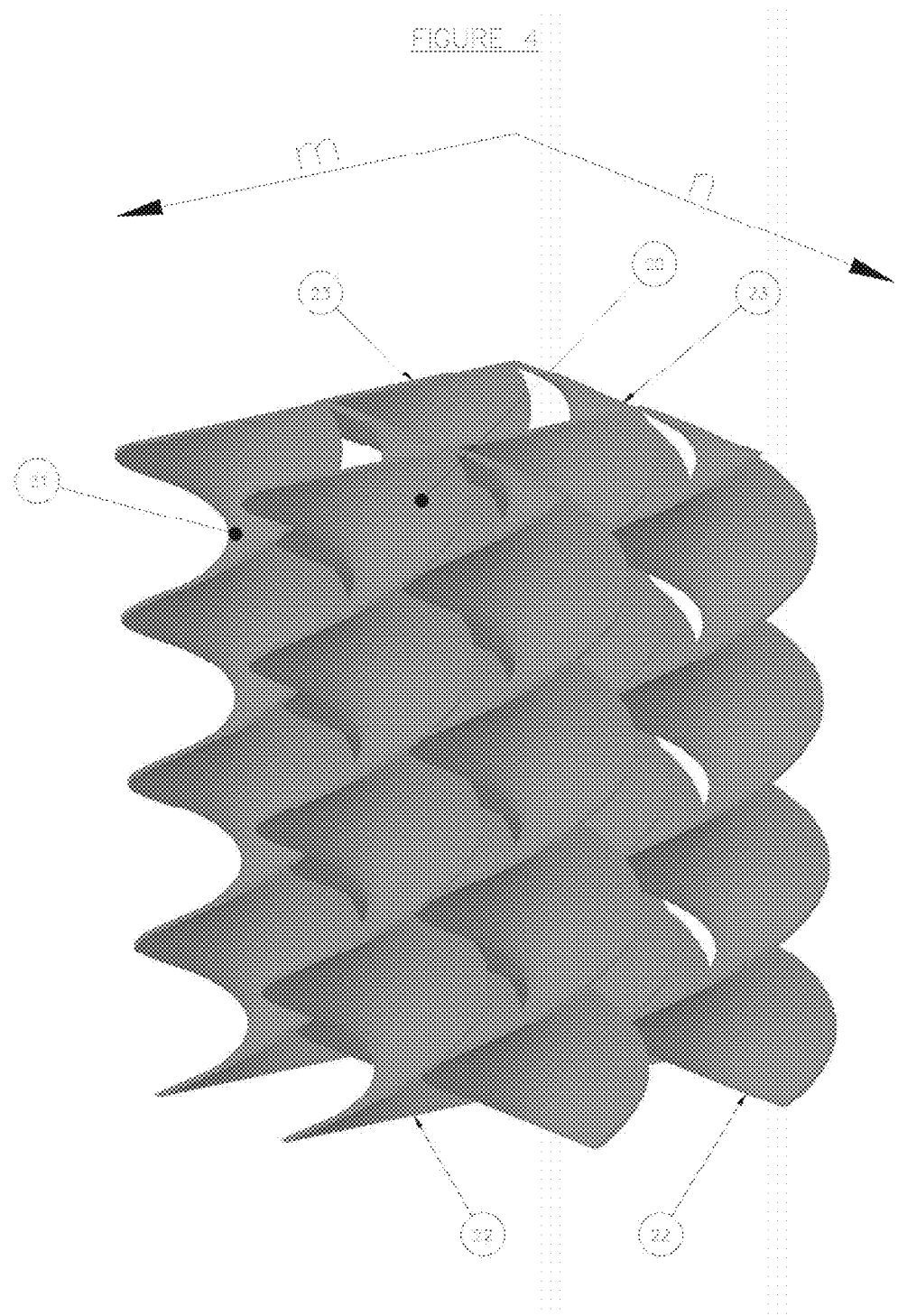

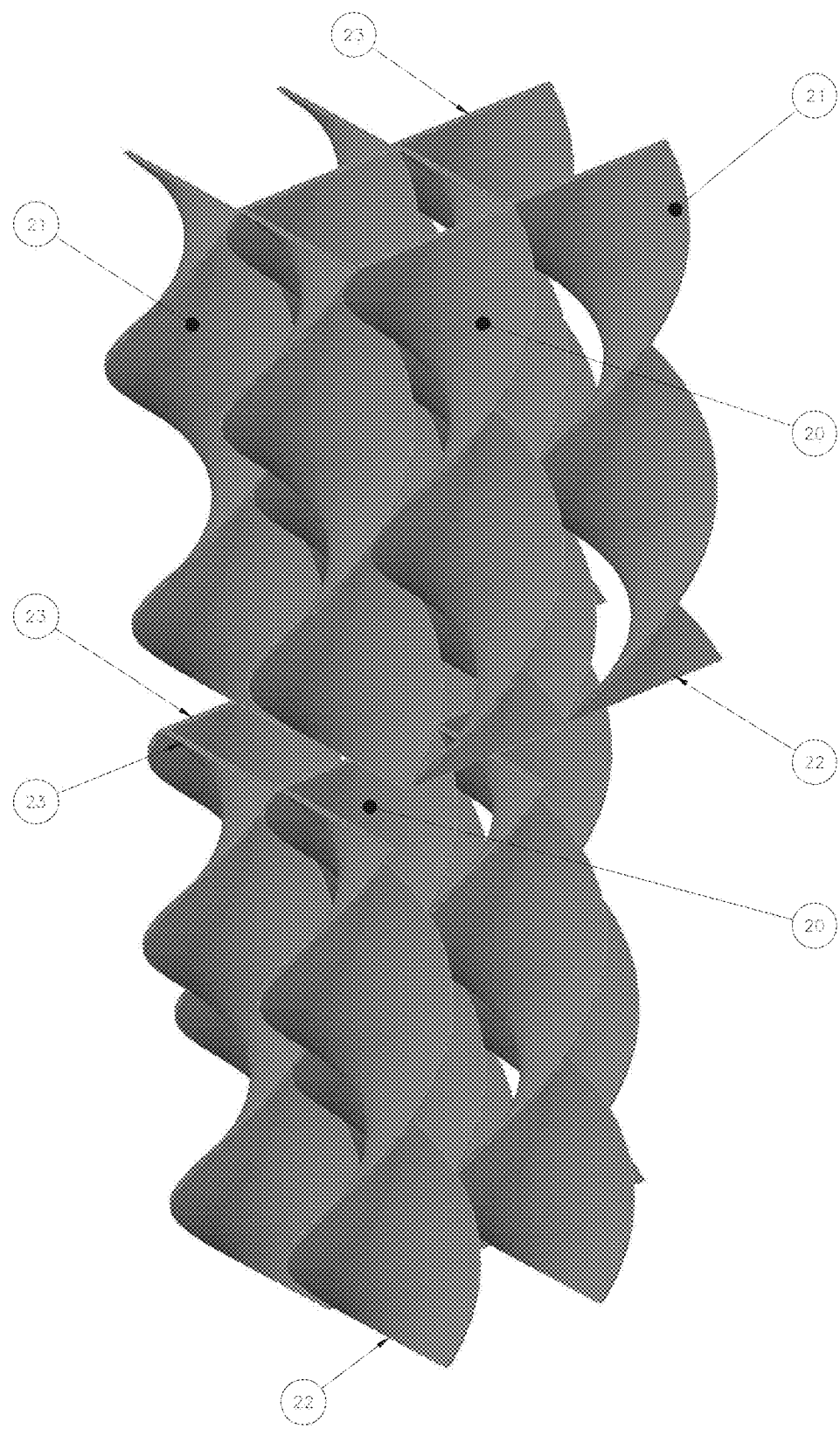

STRUCTURED PACKING ELEMENT HAVING A SPIRAL HELIX SHAPE

The present invention relates to the field of structured packing, used in particular for an operation of stripping hydrocarbons entrained or adsorbed on catalyst particles.

The invention can in particular relate to the field of cracking processes. The present invention can in particular be implemented in a fluid catalytic cracking (FCC) process for cracking heavy feedstocks such as vacuum residues or vacuum distillates, but also in FCCs treating lighter feedstocks. It can also be implemented in naphtha catalytic cracking (NCC) units or also deep catalytic cracking (DCC) or high severity fluid catalytic cracking (HS-FCC) units, or also in methanol to olefins (MTO) or in methanol to gasoline ((MTG) conversion units.

More particularly, the present invention can be used in fluid catalytic cracking units, also called FCC units in the remainder of this description.

The FCC units can operate either with a single riser reactor or downflow reactor geared towards the production of gasoline, or with two reactors, a main reactor geared towards the production of gasoline and a secondary reactor geared towards the production of propylene.

In an FCC process, the hydrocarbons are brought into contact in the reactor with a finely divided catalyst. During the cracking reaction, hydrocarbons, some of which are partially cracked, are deposited on the catalyst. These more-or-less cracked hydrocarbons are generally called "coke". It is therefore necessary to transport the catalyst to one or more regenerators in order to continuously remove these hydrocarbons and thus regenerate the catalyst.

However, it is necessary, before sending spent catalyst to the regenerator, to remove beforehand all or part of the hydrocarbons which have penetrated the high porosity of the catalyst or which are adsorbed on its surface. This makes it possible to reduce and better control the temperature at the regenerator, and to improve the recovery of upgradeable products originating from cracking. This operation is carried out in a stripper in which a gas, generally steam, is circulated in counter-current to the flow of catalyst. Said gas becomes loaded with gaseous hydrocarbons thus removed from the surface or from the porosity of the catalyst. The efficiency of this operation is increased by the addition of baffles or packing in the stripping zone.

The baffles or packing are generally arranged in the lower part of the stripper in the dense phase so as to reduce entrainments of solid particles towards the dilute phase.

Efficient stripping of the hydrocarbons and coke precursors present on the spent catalyst is essential, insofar as the feedstocks treated are increasingly heavy, which requires more severe cracking operating conditions and leads to the formation of more significant quantities of coke on the catalyst.

In a fluidized-bed catalytic unit, the packing arranged in the stripping zone has the advantage of ensuring a good distribution of the catalyst in the stripping zone and having a good efficiency of contact between the spent catalyst and the stripping fluid.

Moreover, the structured packing is also used for bringing fluids into contact, in particular in the fields of gas treatment, distillation, acid gas capture, dehydration or air separation. For these fields of use, the packing fulfils similar functions to the packing used for the stripping. For these uses, the packing also has to be simple and quick to assemble within the column.

The present invention relates to an element of structured packing having a spiral helix shape.

The present invention also relates to a packing structure obtained by assembling such packing elements, the use of such a packing for an operation of bringing a gas and a catalyst into contact, and a process for manufacturing such a structured packing.

The packing structure according to the present invention makes it possible to obtain a better and homogeneous radial distribution of the solids and/or of the fluids brought into contact, in particular of the particles of catalyst along the spiral helixes, and thus improves the contact between the particles of catalyst and the vapour phase for the case of stripping.

BRIEF DESCRIPTION OF THE DRAWINGS

Other characteristics and advantages of the device and process according to the invention will become apparent on reading the following description of non-limitative embodiment examples, with reference to the attached figures which are described below.

FIG. 1a is a general view of a stripper including a packing structure according to the invention. FIG. 1b shows the structured packing of the stripper of FIG. 1.

FIG. 4 represents a three-dimensional view of a packing structure according to an embodiment of the invention.

FIG. 5 shows a three-dimensional view of a set of two packing structures according to an embodiment of the invention.

DETAILED DESCRIPTION OF THE INVENTION

Packing Structure

Figure 1:
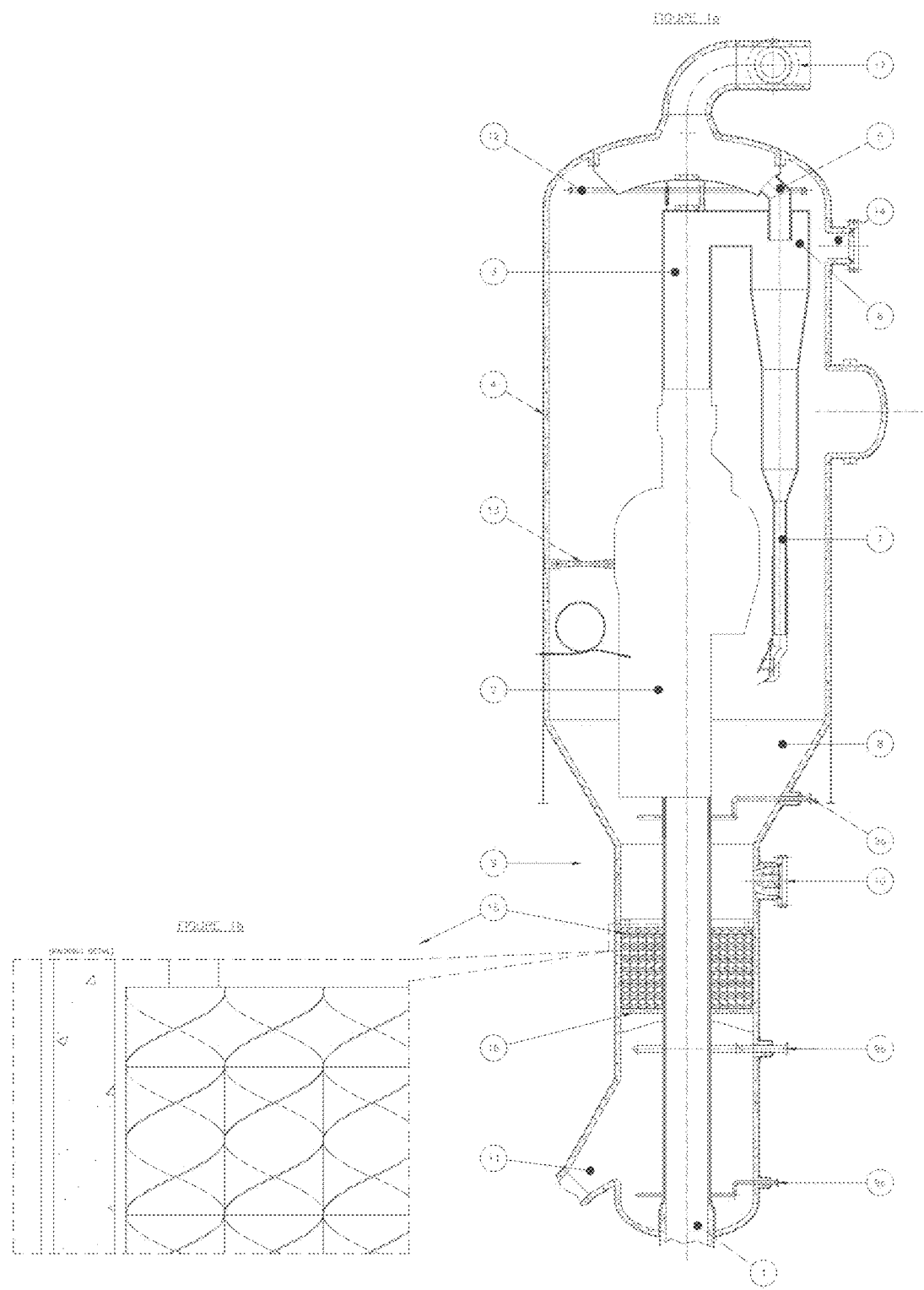
FIG. 1 shows a stripper according to an embodiment of the invention.

The present invention relates to a structured packing structure. By "structured packing" is meant a juxtaposition of several unit elements, also called packing elements, identical or not, arranged in an ordered manner. According to the invention, the unit element of structured packing is a twisted plate substantially having a spiral helix shape. The dimensions of the plate are chosen so that they make it possible to obtain a spiral helix by twisting said plate.

According to the invention, the packing structure is composed of a number n of vertical series of juxtaposed packing elements, where n is at least equal to 2. Each series is composed of m packing elements adjoining in the direction of their height, where m is at least equal to 2. The packing elements of two separate vertical series are juxtaposed in a substantially parallel fashion in the direction of their height. Seen from above, within a series, the packing elements are aligned.

The packing structure according to the present invention makes it possible to obtain an optimized and homogeneous radial distribution of the solids and/or of the fluids brought into contact along the spiral helixes, which makes it possible to improve the exchanges between the solids and/or the fluids. In particular, the packing structure according to the invention makes it possible to obtain a homogeneous radial distribution of the particles of catalyst along the spiral helixes, and thus improves the contact between the particles of catalyst and the vapour phase for the case of stripping.

Preferably, the packing structure comprises n vertical series of packing elements, said series independently comprise a number m of adjoining packing elements, in which,
- n is comprised between 1 and 300, preferably between 2 and 300, and more preferably between 10 and 250, and
- m is comprised between 2 and 300, preferably between 15 and 200.

According to an aspect of the invention, the packing structure can have a height comprised between 20 and 50 cm, preferably between 20 and 40 cm. This dimension allows an insertion of the packing structure into the column. In addition, this dimension substantially corresponds to the length of a packing element.

In order to reinforce the stability and the strength of the packing structure, a positive connection of the structure is implemented by fixing the packing elements, for example by welding, by bonding, by screwing, by bolting, or any similar means. Preferably, the fixing is implemented by welding.

Packing Element

According to the invention, the packing element comprises, preferably is constituted by, a twisted plate having a spiral helix shape. Preferably, the twisted plate before twisting is substantially rectangular. Said packing element is characterized in particular by its height, its width, the value of pitch defining the twist, and the thickness of the twisted plate.

Preferably, the thickness, denoted e, of the plate of the packing element is comprised between 2 and 10 mm, preferably between 4 and 8 mm. This thickness allows twisting of the plate into a spiral helix by any means known to a person skilled in the art.

Preferably, the height, denoted h, of the packing element is comprised between 20 and 100 cm, preferably between 22 and 80 cm and preferably between 25 and 50 cm. This height allows an insertion into a column (for example a stripper).

Preferably the width, denoted I, of the packing element is comprised between 5 and 30 cm and preferably 8 and 25. Thus, the spaces formed in the structured packing have dimensions suitable for promoting the exchanges between the two fluids or between a fluid and solids (for example catalyst).

Preferably, the pitch of the packing element, denoted p, characterizing the helix is comprised between 10 and 30 cm, and preferably between 10 and 20 cm. By "pitch" is meant the distance separating two adjacent crests of the spiral helix parallel to the height of said helix.

Preferably, the pitch of all of the packing elements of one and the same series is identical. Preferably, the pitch of all of the packing elements comprising a packing structure is identical, and thus advantageously allows a regular structure to be obtained.

Preferably, the two edges of the two ends of a packing element are parallel. By "edge" (22 and 23) is meant the ends of the packing element the dimension of which corresponds to the width of the plate. Thus, the packing element forms a whole number of helixes.

Preferably, the extreme edges of the packing elements of one and the same vertical series are parallel to each other.

Preferably, the edges of the two ends of a packing element are perpendicular to the height of said packing element.

Preferably, when the edges of the packing elements of a first vertical series are parallel to each other, the edges of the packing elements of the juxtaposed second vertical series are perpendicular to the edges of the first series. Thus, the packing structure can comprise packing elements with a plurality of series of packing elements with series for which the extreme edges are orientated in a first direction, and with series for which the extreme edges are orientated in a second direction perpendicular to the first direction. For this embodiment, the series in the second direction are juxtaposed between the series in the first direction.

Preferably, the edges of four adjacent packing elements of two juxtaposed series form a square the edges of which are constituted by the edges of said four elements.

Preferably, the height (h) of the packing structure (20) is equal to at least twice the pitch (p) of the spiral helix of the packing element (21) having the highest value of pitch (p). Thus, the packing elements comprise at least two twists.

According to an embodiment, the packing element can be made of metal. It can be formed by machining, by moulding, by plastic deformation of a flat plate or by additive manufacturing.

The packing elements are assembled according to the invention in a packing structure by any means known to a person skilled in the art.

Another subject of the invention relates to a structured packing comprising, preferably constituted by, packing structures according to the invention.

According to a preferred embodiment, the structured packing is composed of a plurality of packing structures independently comprising a number n of series, each of the series independently comprising a number m of packing elements in which n and m can take the values as defined previously.

Advantageously, the structured packing has a circular shape suitable for its use in a catalyst stripping operation.

Figure 2:
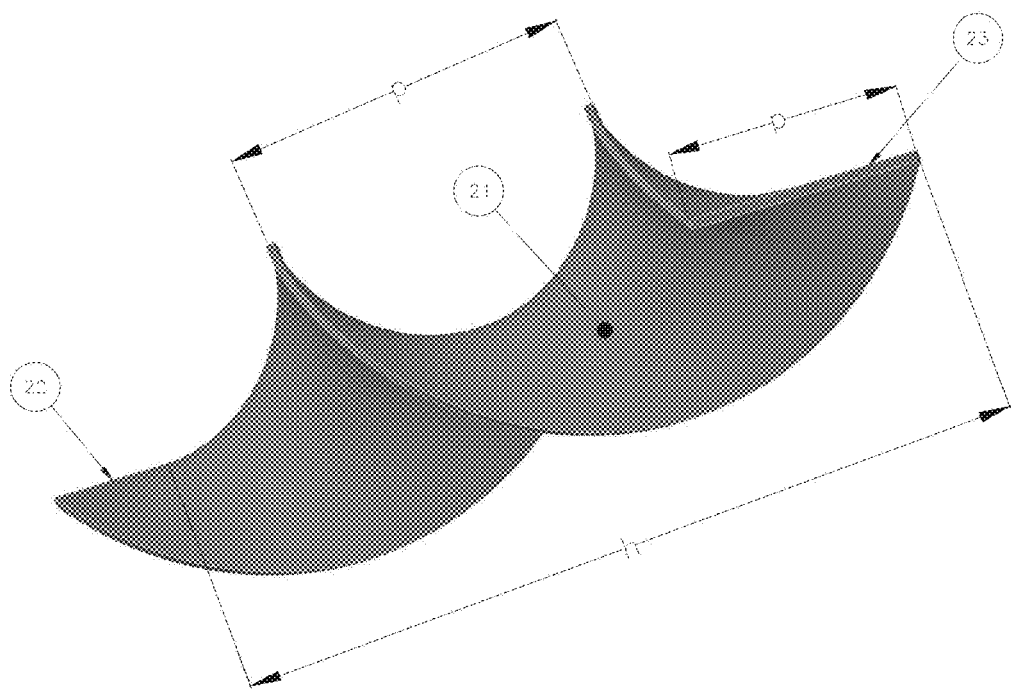
FIG. 2 represents a packing element according to an embodiment of the invention.

FIG. 2 shows, diagrammatically and non-limitatively, a packing element according to an embodiment of the invention. The packing element 21 has a spiral helix shape, with a height denoted h, a width denoted I, a pitch denoted p, a lower edge 22 and an upper edge 23 (the thickness, which is not shown, is less than the height h and the width I).

Figure 3:
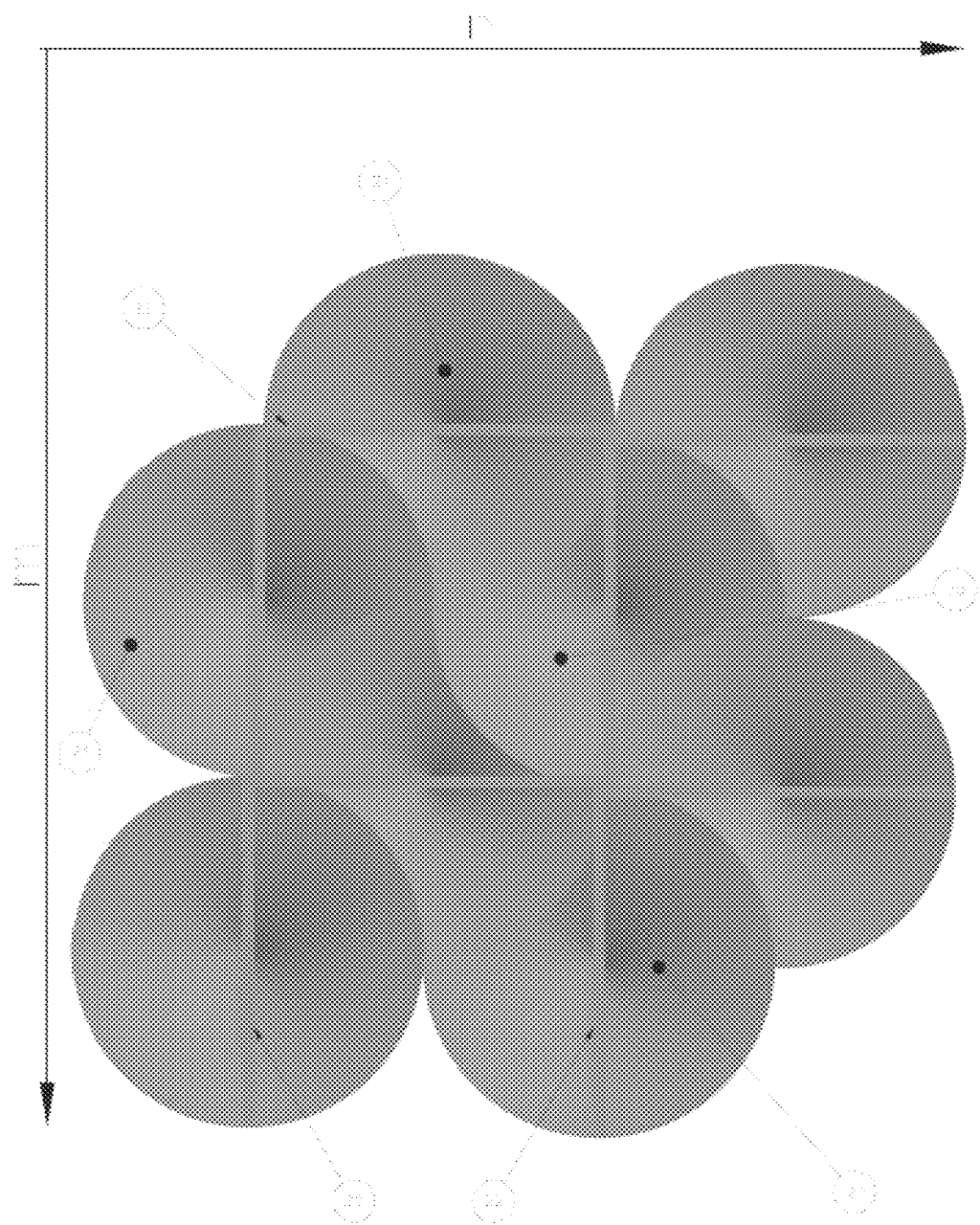
FIG. 3 represents a plan view of one end of a packing structure according to an embodiment of the invention.

FIGS. 3, 4 and 5 represent, diagrammatically and non-limitatively, a packing structure according to an embodiment of the invention.

FIG. 3 is a view of the lower end of a packing structure 20. Said structure comprises 4 series (denoted n), each of the series comprising 2 packing elements (21) (denoted m). The edges (22) of the packing elements (21) of one and the same series are parallel, and the edges of the packing elements of two adjoining series are perpendicular.

FIG. 4 is a three-dimensional view of the packing structure 20. The packing structure comprises 4 series (denoted n), each of the series comprising 2 packing elements (21) (denoted note m). The lower edges (22) of the packing elements (21) of one and the same series are parallel, and the lower edges (22) of the packing elements of two juxtaposed series are perpendicular. The upper edges (23) are arranged in an identical fashion to the lower edges (22).

FIG. 5 is a three-dimensional view of a packing composed of 2 packing structures, each of the structures comprising 4 series (denoted n), each of the series comprising 2 packing elements (21) (denoted m). The lower edges (22) of the packing elements (21) of one and the same series are parallel, and the lower edges (22) of the packing elements of two juxtaposed series are perpendicular. The upper edges (23) are arranged in an identical fashion to the lower edges (22).

Uses

Moreover, the present invention relates to a use of a packing structure according to any combination of the characteristics described previously for bringing a gas into contact with a catalyst, in particular for a stripping operation of a catalyst, for example for an FCC, NCC, DCC, HS-FCC, MTO, MTG process or any similar process.

During this stripping operation of the catalyst, all or part of the hydrocarbons which have penetrated the high porosity of the catalyst or which are adsorbed on its surface are removed. That makes it possible to reduce and better control the temperature at the regenerator (operation after stripping), and to improve the recovery of upgradeable products originating from cracking. This operation is carried out in a stripper in which a gas, generally steam, is circulated in counter-current to the flow of catalyst. Said gas becomes loaded with gaseous hydrocarbons thus removed from the surface or the porosity of the catalyst. The efficiency of this operation is increased by the addition of packing in the stripping zone.

The packing is arranged in the lower part of the stripper in the dense phase so as to reduce the entrainments of solid particles towards the dilute phase.

In a fluidized-bed catalytic unit, the packing according to the invention has the advantage of ensuring a good distribution of the catalyst in the stripping zone and of having a good efficiency of contact between the spent catalyst and the stripping fluid.

For this use, the stripping chamber can comprise:
a system for the separation of the catalyst and the cracked gases,
a cyclone for separating a fraction of catalyst,
a packing as described previously for bringing the catalyst into contact with a gas with the aim of removing the hydrocarbons that have penetrated or been adsorbed by the catalyst, and
at least one gas insertion pipe for distributing the gas over the packing.

FIG. 1a shows, diagrammatically and non-imitatively, a general view of a stripper S including a packing structure according to an embodiment of the invention. This figure shows the top part of the riser reactor 1 which opens into a separation system 2 making it possible to separate the catalyst and the cracked gases. Said system can be of any type known to a person skilled in the art. The cracked gases are sent via the pipe 3 into the cyclone 6 and leave the disengaging vessel 4, situated above the stripping zone of the stripper S, via the pipes 5 and 17.

An additional fraction of catalyst is separated in the cyclone 6 and sent into the dipleg 7 in order to arrive in the dense catalyst bed 8 situated a little lower, above the packing 15. The packing 15 is obtained by superimposition of several structured packing layers as described previously. The packing 15 is held in the stripper S via grids or supports 16. The catalyst is stripped by the steam admitted via the ducts 9a, 9b and 9c then sent to the regenerator (not shown) via the pipe 11. The optional element 12 allows an injection of steam at the top of the stripper in order to discourage the formation of coke. The element 13 is a guide making it possible to keep the separation system 2 away from the wall of the disengaging vessel 4.

FIG. 1b shows, diagrammatically and non-imitatively, a more detailed view of the packing 15 of FIG. 1a.

Generally a structured packing is obtained by superimposition and/or juxtaposition of several layers of packing structure, preferably 2 to 20 layers of packing structure, more preferably 3 to 15 layers and very preferably 4 to 10 layers.

The structured packing according to the invention is also used for bringing fluids, for example a gas and a liquid, into contact, in particular in the fields of gas treatment, distillation, acid gas capture, dehydration or air separation.

Manufacturing Process

The present invention also relates to a manufacturing process of a packing structure, in which the following steps are carried out:
a) manufacturing a plurality of packing elements according to any one of the combinations of characteristics previously described, for example by machining, by moulding, by plastic deformation of a flat plate or by additive manufacturing;
b) constructing an arrangement of the packing elements by means of the following steps:
i) positioning at least two packing elements of a first series of packing elements in one direction;
ii) assembling at least two packing elements of a second series of packing elements in the direction of the height of the elements of the first series;
iii) repeating steps i) and ii) in order to form the desired volume.

Thus assembled, the packing elements of the two series form a three-dimensional mesh delimiting channels for promoting the exchanges. The spiral helixes of the packing elements allow a better radial distribution of the elements to be brought into contact (in particular for a gas with particles of spent catalyst).

Preferably, the manufacturing process comprises a step of fixing the packing elements together, in particular by welding, bonding, screwing, bolting or any similar means. Preferably, the positive connection is implemented by welding.

According to an implementation of the invention, the manufacturing process comprises a step of cutting the packing structure to the desired shape, in particular according to an angular portion of a cylinder (i.e. substantially the shape of a portion of camembert). Thus, the insertion of the packing into a column is facilitated, as well as its assembly Preferably, the extreme edges of the packing elements of the first series are substantially perpendicular to the extreme edges of the packing elements of the second series.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. FR 1758444, filed Sep. 12, 2017 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A packing structure (20) comprising at least two juxtaposed series of identical packing elements (21), in which
said packing elements (21) are twisted plates having a spiral helix shape,
a series comprises at least two packing elements (21) adjoining in the direction of their heights,
the packing elements (21) of two separate series are juxtaposed in a substantially parallel fashion and in the direction of their heights, the edges (22, 23) of the two ends of the packing elements (21) of one and the same series are substantially parallel to each other, and the packing structure comprises at least two series in which the edges (22, 23) of the ends of the packing elements (21) of two juxtaposed series are substantially perpendicular, and the edges of four adjacent packing elements of two juxtaposed series form a square the edges of which are constituted by the edges of said four elements.

2. The packing structure (20) according to claim 1 comprising n series of packing elements (21), said series comprising m adjoining packing elements, where n is comprised between 2 and 300 and m is comprised between 3 and 300.

3. The packing structure (20) according to claim 1 having a spiral helix of a packing element (21) with a pitch (p) of 10 and 30 cm.

4. The packing structure (20) according to claim 1, wherein of all the packing elements have a pitch (p) that is identical.

5. The packing structure (20) according to claim 1, wherein each of the packing elements has a width (l) of 5 to 30 cm.

6. The packing structure (20) according to claim 1, wherein the packing structure (21) has a height (h) of 20 to 100 cm.

7. The packing structure (20) according to claim 1, wherein the packing structure has a height (h) equal to at least twice a pitch (p) of a spiral helix of the packing elements (21) having the highest value of pitch (p).

8. A structured packing (15) composed of at least two packing structures (20) according to claim 1.

9. A process for stripping a catalyst, comprising stripping said catalyst with a gas in the presence of a structured packing (15) according to claim 1.

* * * * *